US012647301B2

(12) United States Patent
Kikuchi et al.

(10) Patent No.: US 12,647,301 B2
(45) Date of Patent: Jun. 2, 2026

(54) ON-BOARD RELAY APPARATUS, ON-BOARD APPARATUS, AND SLEEP NOTIFICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yoshitaka Kikuchi, Yokkaichi (JP); Takeshi Hagihara, Yokkaichi (JP); Hirofumi Urayama, Yokkaichi (JP); Hideki Maeda, Yokkaichi (JP); Darmawan Go, Yokkaichi (JP); Tomohiro Otsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 356 days.

(21) Appl. No.: 18/570,798

(22) PCT Filed: Jun. 20, 2022

(86) PCT No.: PCT/JP2022/024471
§ 371 (c)(1),
(2) Date: Dec. 15, 2023

(87) PCT Pub. No.: WO2023/276746
PCT Pub. Date: Jan. 5, 2023

(65) Prior Publication Data
US 2024/0223404 A1      Jul. 4, 2024

(30) Foreign Application Priority Data

Jun. 29, 2021      (JP) ................................. 2021-107615

(51) Int. Cl.
*H04L 12/46* (2006.01)
*H04L 12/10* (2006.01)

(52) U.S. Cl.
CPC .......... *H04L 12/4675* (2013.01); *H04L 12/10* (2013.01)

(58) Field of Classification Search
CPC ............................ H04L 12/10; H04L 12/4675
(Continued)

(56) References Cited

U.S. PATENT DOCUMENTS

2009/0285221 A1* 11/2009 Ito ....................... H04L 41/0803
370/395.53
2020/0159307 A1* 5/2020 Roy ....................... G06F 1/3209

FOREIGN PATENT DOCUMENTS

JP      2005-159864 A      6/2005
JP      2011-087112 A      4/2011
(Continued)

OTHER PUBLICATIONS

International Search Report, Application No. PCT/JP2022/024471, mailed Sep. 13, 2022. ISA/Japan Patent Office.

*Primary Examiner* — Peter G Solinsky
(74) *Attorney, Agent, or Firm* — Brooks Kushman P.C.

(57) ABSTRACT

An on-board relay apparatus includes: a relaying unit configured to relay information between a plurality of on-board apparatuses belonging to mutually different virtual local area networks (VLANs); a detecting unit configured to detect that the on-board apparatuses have transitioned to a sleep state; and a notifying unit configured to, if it is detected by the detecting unit that a first on-board apparatus among the plurality of on-board apparatuses has transitioned to the sleep state, provide a second on-board apparatus among the (Continued)

plurality of on-board apparatuses with a sleep notification indicating that the first on-board apparatus has transitioned to the sleep state.

18 Claims, 5 Drawing Sheets

(58) Field of Classification Search
USPC ......................................................... 370/389
See application file for complete search history.

(56) References Cited

FOREIGN PATENT DOCUMENTS

| JP | 2017-092565 A | 5/2017 |
| JP | 2020-088568 A | 6/2020 |

* cited by examiner

| | Pair of on-board ECUs | Necessity of sleep notification (necessity of active notification) |
|---|---|---|
| P1 | On-board ECU 111A,111C | Necessary |
| P2 | On-board ECU 111A,111D | Unnecessary |
| P3 | On-board ECU 111B,111C | Unnecessary |
| P4 | On-board ECU 111B,111D | Unnecessary |

Tb1

ON-BOARD RELAY APPARATUS, ON-BOARD APPARATUS, AND SLEEP NOTIFICATION METHOD

CROSS-REFERENCE TO RELATED APPLICATIONS

This application is the U.S. national stage of PCT/JP2022/024471 filed on Jun. 20, 2022, which claims priority of Japanese Patent Application No. JP 2021-107615, filed on Jun. 29, 2021, the contents of which are incorporated herein.

TECHNICAL FIELD

The present disclosure relates to an on-board relay apparatus, an on-board apparatus, and a sleep notification method.

BACKGROUND

JP 2020-88568A discloses an electronic control apparatus that is characterized as follows. Specifically, the electronic control apparatus is one of a plurality of electronic control apparatuses that constitute an on-board network system and that can communicate with one another, the electronic control apparatus including: a first communication controlling unit configured to control CAN (registered trademark)-based communication with another electronic control apparatus; and a second communication controlling unit configured to control Ethernet (registered trademark)-based communication with the other electronic control apparatus, the second communication controlling unit being configured to place the state of the Ethernet-based communication with the other electronic control apparatus in a communication-enabled state if the communication state of the CAN controlled by the first communication controlling unit is an awake state and to place the state of the Ethernet-based communication with the other electronic control apparatus in a communication-disabled state if the communication state of the CAN controlled by the first communication controlling unit is a sleep state.

Recent years have seen a trend toward an increase in communication traffic in on-board communication systems as a result of communication for autonomous driving control, for example, being performed in on-board communication systems. In order to suppress communication band congestion in an on-board communication system, there is a demand to reduce the communication traffic in the on-board communication system as much as possible without affecting the functions of on-board apparatuses.

There is a demand for a technique realizing a further reduction in the communication traffic in an on-board communication system, beyond that by the technique disclosed in JP 2020-88568A.

The present disclosure has been made to solve the above-described problem, and an aim thereof is to provide an on-board relay apparatus, an on-board apparatus, and a sleep notification method that can reduce communication traffic in an on-board communication system to a further extent.

SUMMARY

An on-board relay apparatus according to the present disclosure includes: a relaying unit configured to relay information between a plurality of on-board apparatuses belonging to mutually different virtual local area networks (VLANs); a detecting unit configured to detect that the on-board apparatuses have transitioned to a sleep state; and a notifying unit configured to, if it is detected by the detecting unit that a first on-board apparatus among the plurality of on-board apparatuses has transitioned to the sleep state, provide a second on-board apparatus among the plurality of on-board apparatuses with a sleep notification indicating that the first on-board apparatus has transitioned to the sleep state.

An on-board apparatus according to the present disclosure includes: a transmitting unit configured to transmit information to another on-board apparatus belonging to a different VLAN via an on-board relay apparatus; and a receiving unit configured to receive, from the on-board relay apparatus, a sleep notification indicating that the other on-board apparatus has transitioned to a sleep state, wherein the transmitting unit stops transmitting information to the other on-board apparatus if the receiving unit receives the sleep notification.

A sleep notification method according to the present disclosure includes: a step for relaying information between a plurality of on-board apparatuses belonging to mutually different VLANs; a step for detecting that a first on-board apparatus among the plurality of on-board apparatuses has transitioned to a sleep state; and a step for providing a second on-board apparatus among the plurality of on-board apparatuses with a sleep notification indicating that the first on-board apparatus has transitioned to the sleep state.

One aspect of the present disclosure not only can be realized as an on-board relay apparatus including such characteristic processing units, but also can be realized as a program for causing a computer to execute steps of such characteristic processing, as a semiconductor integrated circuit realizing a part of or the entirety of the on-board relay apparatus, or as an on-board communication system including the on-board relay apparatus. Furthermore, one aspect of the present disclosure not only can be realized as an on-board apparatus including such characteristic processing units, but also can be realized as a communication program including such characteristic processing as steps, as a program for causing a computer to execute such steps, as a semiconductor integrated circuit realizing a part of or the entirety of the on-board apparatus, or as an on-board communication system including the on-board apparatus.

Advantageous Effects

According to the present disclosure, communication traffic in an on-board communication system can be reduced to a further extent.

DETAILED DESCRIPTION OF PREFERRED EMBODIMENTS

Figure 1:
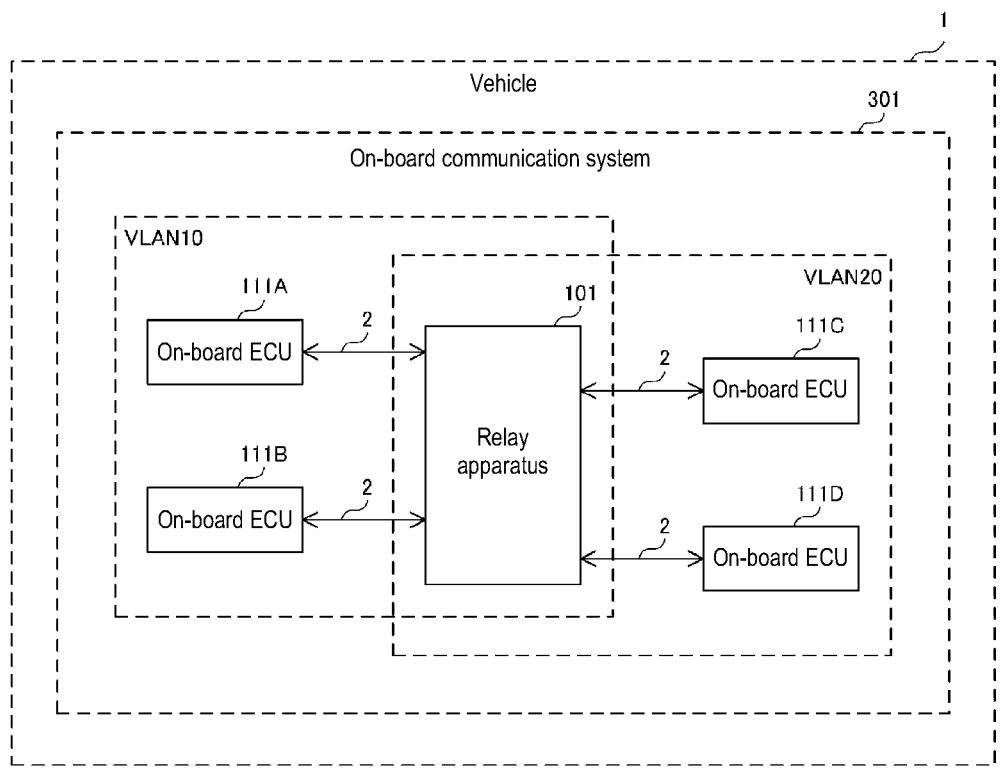
FIG. 1 is a diagram illustrating a configuration of an on-board communication system according to an embodiment of the present disclosure.

First, aspects of embodiment of the present disclosure will be listed and described.

An on-board relay apparatus according to an embodiment of the present disclosure includes: a relaying unit configured to relay information between a plurality of on-board apparatuses belonging to mutually different VLANs; a detecting unit configured to detect that the on-board apparatuses have transitioned to a sleep state; and a notifying unit configured to, if it is detected by the detecting unit that a first on-board apparatus among the plurality of on-board apparatuses has transitioned to the sleep state, provide a second on-board apparatus among the plurality of on-board apparatuses with a sleep notification indicating that the first on-board apparatus has transitioned to the sleep state.

As a result of a configuration being adopted in which the on-board relay apparatus detects that an on-board apparatus has transitioned to the sleep state and provides another on-board apparatus belonging to a VLAN different from the VLAN of the on-board apparatus with a sleep notification indicating that the on-board apparatus has transitioned to the sleep state in such a manner, it is possible to have the other on-board apparatus recognize that the on-board apparatus has transitioned to the sleep state, and thus transmission of information from the other on-board apparatus to the on-board apparatus during a period in which the on-board apparatus is in the sleep state can be stopped, for example. Thus, communication traffic in an on-board communication system can be reduced to a further extent.

The detecting unit may detect that the first on-board apparatus has transitioned to the sleep state if a first network management (NM) message that is periodically broadcast by the first on-board apparatus within a VLAN to which the first on-board apparatus belongs and that indicates that the first on-board apparatus is in an active state does not arrive for a predetermined amount of time.

As a result of such a configuration being adopted, the transition of the first on-board apparatus to the sleep state can be accurately detected through simple processing using an NM message conforming to the conventional AUTomotive Open System ARchitecture (AUTOSAR) specification.

If the first NM message does not arrive for the predetermined amount of time, the detecting unit may determine whether the first on-board apparatus has transitioned to the sleep state or has failed.

As a result of such a configuration being adopted, if the first NM message does not arrive for the predetermined amount of time, it can be determined whether the first on-board apparatus has transitioned to the sleep state or has failed, and processing that is in accordance with the result of the determination can be performed.

The on-board relay apparatus may further include a storage unit configured to store therein notification necessity information indicating a correspondence between a pair of the on-board apparatuses belonging to mutually different VLANs, and a necessity as to, if one of the on-board apparatuses in the pair has transitioned to the sleep state, whether or not it is necessary to provide the other on-board apparatus in the pair with the sleep notification.

As a result of such a configuration being adopted, a sleep notification can be selectively provided, based on the notification necessity information stored in the storage unit, to an on-board apparatus to which the sleep notification should be provided, and thus a sleep notification can be provided to an on-board apparatus that periodically transmits information to an on-board apparatus that has transitioned to the sleep state, for example.

The second on-board apparatus may be a sensor, and the first on-board apparatus may be a driving assistance apparatus that provides driving assistance based on a measurement result of the sensor.

In driving assistance systems, there are cases in which a sensor transmits measurement results to a driving assistance apparatus in a short cycle and the driving assistance apparatus frequently transitions to the sleep state as a result of the vehicle stopping; given this, communication traffic in an on-board communication system can be reduced more effectively by having a sensor recognize that a driving assistance apparatus has transitioned to the sleep state and stopping the transmission of measurement information from the sensor to the driving assistance apparatus during a period in which the driving assistance apparatus is in the sleep state.

The on-board relay apparatus may further include a transmitting unit configured to periodically transmit, to the on-board apparatuses, a second NM message that indicates that the on-board relay apparatus is in the active state, wherein the transmitting unit may continue to transmit the second NM message to the second on-board apparatus even after it is detected by the detecting unit that the first on-board apparatus has transitioned to the sleep state, and the notifying unit may provide the second on-board apparatus with the sleep notification by including, in the second NM message transmitted by the transmitting unit, information indicating that the first on-board apparatus has transitioned to the sleep state.

As a result of such a configuration being adopted, the second on-board apparatus can be provided with the sleep notification through processing that is simpler compared to a configuration in which the first on-board apparatus separately generates a message indicating that the first on-board apparatus has transitioned to the sleep state and transmits the generated message to the second on-board apparatus.

An on-board apparatus according to an embodiment of the present disclosure is an on-board apparatus including: a transmitting unit configured to transmit information to another on-board apparatus belonging to a different VLAN via an on-board relay apparatus; and a receiving unit configured to receive, from the on-board relay apparatus, a sleep notification indicating that the other on-board apparatus has transitioned to a sleep state, wherein the transmitting unit stops transmitting information to the other on-board apparatus if the receiving unit receives the sleep notification.

As a result of a configuration being adopted in which a sleep notification indicating that another on-board apparatus belonging to a different VLAN has transitioned to the sleep state is received from an on-board relay apparatus and the transmission of information to the other on-board apparatus is stopped in such a manner, the transmission of information to the other on-board apparatus during a period in which the other on-board apparatus cannot receive information can be stopped. Thus, communication traffic in an on-board communication system can be reduced to a further extent.

The transmitting unit may periodically broadcast, within a VLAN to which the on-board apparatus belongs, an NM message indicating that the on-board apparatus is in an active state, and the transmitting unit may continue to broadcast the NM message even after the receiving unit receives the sleep notification.

By such a configuration being adopted, it is possible to have the on-board relay apparatus and the like recognize that the on-board apparatus is in the active state, and a state in which the on-board apparatus can receive information from another on-board apparatus via the on-board relay apparatus can be maintained.

A sleep notification method according to an embodiment of the present disclosure includes: a step for relaying information between a plurality of on-board apparatuses belonging to mutually different VLANs; a step for detecting that a first on-board apparatus among the plurality of on-board apparatuses has transitioned to a sleep state; and a step for providing a second on-board apparatus among the plurality of on-board apparatuses with a sleep notification indicating that the first on-board apparatus has transitioned to the sleep state.

As a result of a method being adopted in which an on-board relay apparatus detects that an on-board apparatus has transitioned to the sleep state and provides another on-board apparatus belonging to a VLAN different from the VLAN of the on-board apparatus with a sleep notification indicating that the on-board apparatus has transitioned to the sleep state in such a manner, it is possible to have the other on-board apparatus recognize that the on-board apparatus has transitioned to the sleep state, and thus transmission of information from the other on-board apparatus to the on-board apparatus during a period in which the on-board apparatus is in the sleep state can be stopped, for example. Thus, communication traffic in an on-board communication system can be reduced to a further extent.

In the following, embodiments of the present disclosure will be described with reference to the drawings. Note that the same symbol is provided to the same or corresponding portions in the drawings, and description thereof will not be repeated. Furthermore, at least some of the embodiments described in the following may be combined as appropriate.

FIG. 1 is a diagram illustrating a configuration of an on-board communication system according to an embodiment of the present disclosure. With reference to FIG. 1, an on-board communication system 301 includes a relay apparatus 101, and on-board electronic control units (ECUs) 111A, 111B, 111C, and 111D. In the following, the on-board ECUs 111A, 111B, 111C, and 111D are also referred to as on-board ECUs 111. The relay apparatus 101 is one example of an on-board relay apparatus. The on-board ECUs 111 are examples of on-board apparatuses. The on-board communication system 301 is installed in a vehicle 1. In other words, the relay apparatus 101 and the on-board ECUs 111 are installed in the vehicle 1.

The on-board communication system 301 is not limited to being configured to include one relay apparatus 101, and may be configured to include two or more relay apparatuses 101. Note that the on-board communication system 301 is not limited to being configured to include four on-board ECUs 111, and may be configured to include two, three, or five or more on-board ECUs 111.

The relay apparatus 101 is connected to the on-board ECUs 111A, 111B, 111C, and 111D via cables 2. For example, the cables 2 are Ethernet cables. The relay apparatus 101, the on-board ECUs 111, and the cables 2 form an on-board network.

For example, the on-board ECUs 111A and 111B belong to a VLAN 10, the on-board ECUs 111C and 111D belong to a VLAN 20, and the relay apparatus 101 belongs to the VLANS 10 and 20.

The relay apparatus 101 can relay information between a plurality of on-board ECUs 111 belonging to the same VLAN in the on-board network. Specifically, the relay apparatus 101 relays information between the on-board ECUs 111A and 111B, and between the on-board ECUs 111C and 111D.

Furthermore, the relay apparatus 101 can relay information between a plurality of on-board ECUs 111 belonging to mutually different VLANs in the on-board network. Specifically, the relay apparatus 101 relays information between the on-board ECUs 111A and 111C, for example.

For example, the on-board ECUs 111 are each: an electric power steering (EPS); a brake control apparatus; an accelerator control apparatus; a steering control apparatus; a driving assistance apparatus that provides instructions, etc., to various apparatuses in an advanced driver-assistance system (ADAS); an in-vehicle infotainment (IVI) apparatus that has functions such as an audio playback function and a car navigation function; or a sensor such as a camera.

As one example, the on-board ECU 111A is a sensor. The sensor may be a vehicle-speed sensor that measures the speed of the vehicle 1, or may be a camera that captures images of the surroundings of the vehicle 1. Furthermore, the on-board ECU 111B is an IVI apparatus. The on-board ECU 111C is a driving assistance apparatus. The on-board ECU 111D is a steering control apparatus. The on-board ECU 111A is one example of a second on-board apparatus. The on-board ECU 111C is one example of a first on-board apparatus.

For example, the on-board ECU 111A, which is a sensor, periodically generates Ethernet frames including measurement information indicating measurement results and transmits the generated Ethernet frames to the on-board ECU 111C via the relay apparatus 101. The on-board ECU 111C receives the Ethernet frames from the on-board ECU 111A via the relay apparatus 101, and acquires the measurement information from the received Ethernet frame. The on-board ECU 111C, which is a driving assistance apparatus, performs driving assistance based on the measurement results indicated by the acquired measurement information.

Note that the on-board communication system 301 may be configured to include other on-board apparatuses, such as a brake control apparatus and an accelerator control apparatus, in place of some or all of the on-board ECUs 111A, 111B, 111C, and 111D or in addition to the on-board ECUs 111A, 111B, 111C, and 111D.

The on-board ECUs 111 transition from an active state to a sleep state if the state of the vehicle 1 satisfies a predetermined sleep condition while the on-board ECUs 111 are in the active state. Furthermore, the on-board ECUs 111 transition from the sleep state to the active state if the state of the vehicle 1 satisfies a predetermined wake-up condition while the on-board ECUs 111 are in the sleep state. Here, the sleep state is a state in which power consumption is lower than that in the active state as a result of some functions of the on-board ECUs 111 being stopped, power supply to the on-board ECUs 111 being stopped, the clock frequency in the on-board ECUs 111 being reduced, or the like. The sleep state is also called a standby power supply mode state, an idle state, a power saving state, a standby state, or the like.

The active state is also called a normal activation state, a normal operation state, a non-sleep state, or the like.

For example, the sleep condition of the on-board ECUs 111 is that the vehicle 1 has stopped, that the speed of the vehicle 1 has fallen below a predetermined value, that the vehicle 1 has been turned off, or the like. For example, the wake-up condition of the on-board ECUs 111 is that the vehicle 1 has started traveling, that the speed of the vehicle 1 has equaled or exceeded the predetermined value, the vehicle 1 has been turned on, or the like. For example, the on-board ECUs 111 transition from the sleep state to the active state and from the active state to the sleep state based on a sleep condition and a wake-up condition that are set in advance for the individual on-board ECUs 111.

For example, each on-board ECU 111 periodically broadcasts AUTOSAR NM messages within the VLAN to which the on-board ECU 111 belongs while the on-board ECU 111 is in the active state. Specifically, each on-board ECU 111 broadcasts Ethernet frames including NM messages within the VLAN to which the on-board ECU 111 belongs.

Furthermore, for example, the relay apparatus 101 periodically transmits AUTOSAR NM messages to the on-board ECUs 111 while the relay apparatus 101 is in the active state. Specifically, the relay apparatus 101 transmits Ethernet frames including NM messages to the on-board ECUs 111.

For example, if the arrival of NM messages from all of the on-board ECUs 111 stops while the relay apparatus 101 is in the active state, the relay apparatus 101 transitions from the active state to the sleep state. Furthermore, for example, if the relay apparatus 101 receives an NM message from at least one of the on-board ECUs 111 while the relay apparatus 101 is in the sleep state, the relay apparatus 101 transitions from the sleep state to the active state.

Figure 2:
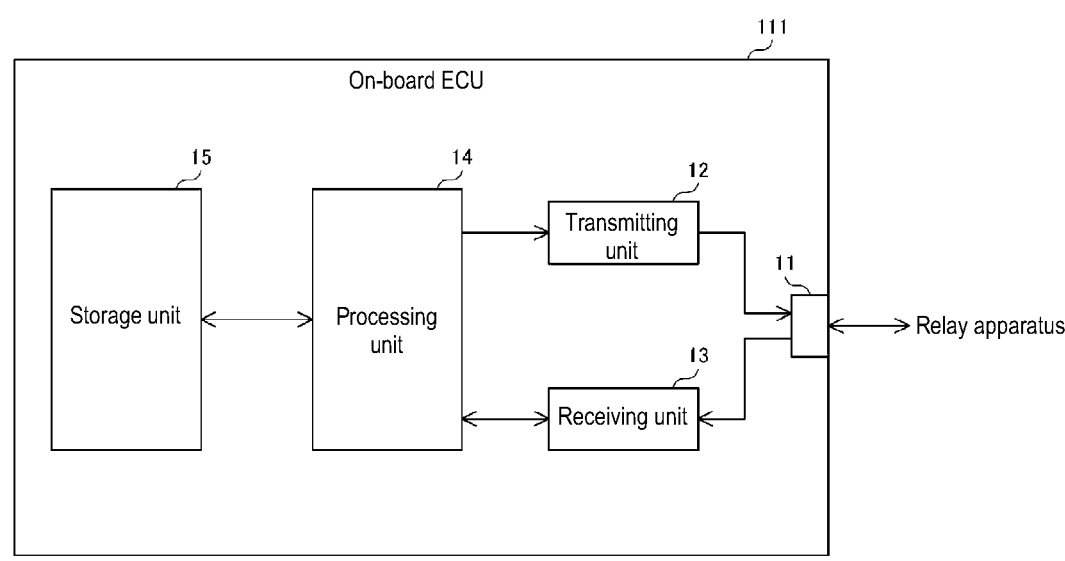
FIG. 2 is a diagram illustrating a configuration of on-board ECUs according to the embodiment of the present disclosure.

FIG. 2 is a diagram illustrating a configuration of the on-board ECUs according to the embodiment of the present disclosure. With reference to FIG. 2, each on-board ECU 111 includes a communication port 11, a transmitting unit 12, a receiving unit 13, a processing unit 14, and a storage unit 15. For example, the transmitting unit 12, the receiving unit 13, and the processing unit 14 are realized by a processor such as a central processing unit (CPU) or a digital signal processor (DSP). For example, the storage unit 15 is a non-volatile memory.

For example, the communication port 11 is a terminal to which a cable 2 can be connected. Note that the communication port 11 may be a terminal of an integrated circuit. The communication port 11 is connected to the relay apparatus 101 via the cable 2.

The processing unit 14 generates information to be transmitted to another on-board ECU 111, and outputs the generated information to the transmitting unit 12. Specifically, for example, the processing unit 14 in the on-board ECU 111A, which is a sensor, generates and outputs, to the transmitting unit 12, measurement information indicating a measurement result at transmission timings that are in accordance with a predetermined cycle.

The transmitting unit 12 transmits information to another on-board ECU 111 belonging to a different VLAN via the relay apparatus 101. Specifically, the transmitting unit 12 in the on-board ECU 111A receives measurement information from the processing unit 14, generates an Ethernet frame including the received measurement information, and transmits the generated Ethernet frame to the on-board ECU 111C belonging to the VLAN 20 via the communication port 11 and the relay apparatus 101. Note that the transmitting unit 12 may transmit an Ethernet frame including information received from the processing unit 14 to an on-board ECU 111 belonging to the same VLAN 10 via the communication port 11 and the relay apparatus 101.

The receiving unit 13 receives an Ethernet frame from another on-board ECU 111 via the relay apparatus 101 and the communication port 11, acquires information from the received Ethernet frame, and outputs the acquired information to the processing unit 14. Specifically, for example, the receiving unit 13 in the on-board ECU 111C, which is a driving assistance apparatus, receives an Ethernet frame from the on-board ECU 111A via the relay apparatus 101 and the communication port 11, acquires measurement information from the received Ethernet frame, and outputs the acquired measurement information to the processing unit 14.

The processing unit 14 stores information received from the receiving unit 13 to the storage unit 15, and processes information stored in the storage unit 15. Specifically, for example, the processing unit 14 in the on-board ECU 111C, which is a driving assistance apparatus, generates control information to be used for driving assistance based on measurement information received from the receiving unit 13, and transmits the generated control information to another on-board apparatus, such as an accelerator control apparatus, via the transmitting unit 12, the communication port 11, and the relay apparatus 101.

For example, the transmitting unit 12 periodically broadcasts, within the VLAN to which the on-board ECU 111 including the transmitting unit 12 belongs, NM messages indicating that the on-board ECU 111 is in the active state. Specifically, while the on-board ECU 111 including the transmitting unit 12 is in the active state, the transmitting unit 12 periodically generates Ethernet frames that include a broadcast address as a destination IP address and include NM messages, and transmits the generated Ethernet frames to the relay apparatus 101 via the communication port 11. The NM messages broadcast by the transmitting unit 12 are examples of a first NM message.

For example, the storage unit 15 stores therein the sleep condition and the wake-up condition of the on-board ECU 111.

If the processing unit 14 detects that the state of the vehicle 1 has satisfied the sleep condition in the storage unit 15 while the on-board ECU 111 is in the active state, the processing unit 14 causes the on-board ECU 111 to transition from the active state to the sleep state. For example, the processing unit 14 causes the on-board ECU 111 to transition from the active state to the sleep state after a predetermined amount of time elapses from when the processing unit 14 detects that the state of the vehicle 1 has satisfied the sleep condition.

Specifically, after a predetermined amount of time elapses from when the processing unit 14 detects that the state of the vehicle 1 has satisfied the sleep condition, the processing unit 14 stops generating information to be transmitted to another on-board ECU 111. Furthermore, upon detecting that the state of the vehicle 1 has satisfied the sleep condition, the processing unit 14 outputs a receive stop instruction and a transmit stop instruction to the receiving unit 13 and the transmitting unit 12, respectively.

Upon receiving the receive stop instruction from the processing unit 14, the receiving unit 13 stops receiving Ethernet frames from the relay apparatus 101 after a predetermined amount of time elapses from when the receiving unit 13 receives the receive stop instruction.

Upon receiving the transmit stop instruction from the processing unit 14, the transmitting unit 12 stops periodically broadcasting NM messages after a predetermined amount of time elapses from when the transmitting unit 12 receives the transmit stop instruction. For example, during the period from when the transmitting unit 12 receives the transmit stop instruction to when the predetermined amount of time elapses, the transmitting unit 12 broadcasts one or more NM messages that include transition information indicating transition to the sleep state. As one example, the transmitting unit 12 includes the transition information in the NM message to be broadcast last during the period from when the transmitting unit 12 receives the transmit stop instruction to when the predetermined amount of time elapses, and broadcasts the NM message.

Furthermore, if the processing unit 14 detects that the state of the vehicle 1 has satisfied the wake-up condition in the storage unit 15 while the on-board ECU 111 is in the sleep state, the processing unit 14 causes the on-board ECU 111 to transition from the sleep state to the active state.

Specifically, if the processing unit 14 detects that the state of the vehicle 1 has satisfied the wake-up condition, the processing unit 14 starts generating information to be transmitted to another on-board ECU 111. Furthermore, upon detecting that the state of the vehicle 1 has satisfied the wake-up condition, the processing unit 14 outputs a receive start instruction and a transmit start instruction to the receiving unit 13 and the transmitting unit 12, respectively.

Upon receiving the receive start instruction from the processing unit 14, the receiving unit 13 transitions to a standby state in which the receiving unit 13 can receive Ethernet frames from the relay apparatus 101.

Upon receiving the transmit start instruction from the processing unit 14, the transmitting unit 12 starts to periodically broadcast NM messages.

Figures 3, 4:
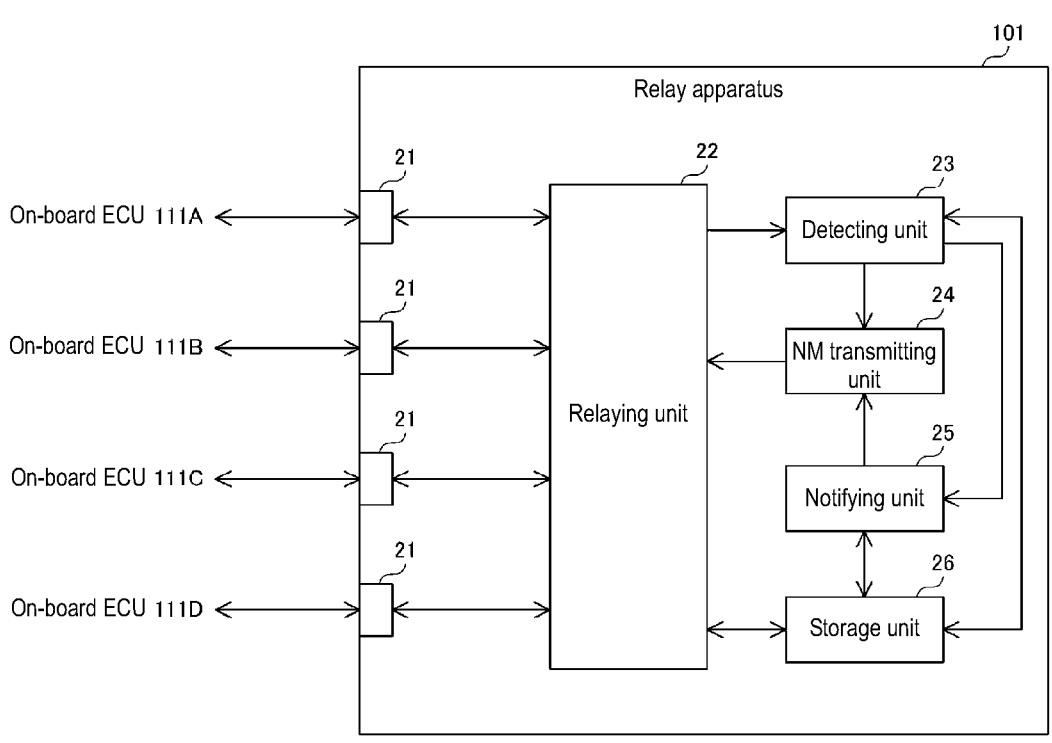
FIG. 3 is a diagram illustrating a configuration of a relay apparatus according to the embodiment of the present disclosure.
FIG. 4 is a diagram illustrating one example of a notification necessity table stored in a storage unit of the relay apparatus according to the embodiment of the present disclosure.

FIG. 3 is a diagram illustrating a configuration of the relay apparatus according to the embodiment of the present disclosure. With reference to FIG. 3, the relay apparatus 101 includes four communication ports 21, a relaying unit 22, a detecting unit 23, an NM transmitting unit 24, a notifying unit 25, and a storage unit 26. Note that the relay apparatus 101 is not limited to being configured to include four communication ports 21, and may be configured to include two, three, or five or more communication ports 21. For example, the relaying unit 22, the detecting unit 23, the NM transmitting unit 24, and the notifying unit 25 are realized by a processor such as a CPU or a DSP. For example, the storage unit 26 is a non-volatile memory.

For example, the communication ports 21 are terminals to which cables 2 can be connected. Note that the communication ports 21 may be terminals of an integrated circuit. For example, the four communication ports 21 are respectively connected to the four on-board ECUs 111.

The storage unit 26 stores therein an address table that indicates the correspondence between transmission source Internet Protocol (IP) addresses and destination IP addresses included in Ethernet frames that could be received from the on-board ECUs 111, and port numbers of the communication ports 21.

The relaying unit 22 relays information between a plurality of on-board ECUs 111. That is, the relaying unit 22 performs relay processing for receiving an Ethernet frame from an on-board ECU 111 via a communication port 21 and relaying the received Ethernet frame.

Specifically, the relaying unit 22 acquires a transmission source IP address and a destination IP address from a received Ethernet frame. The relaying unit 22 refers to the address table in the storage unit 26 to specify a port number corresponding to the acquired transmission source IP address and destination IP address. Furthermore, the relaying unit 22 transmits the Ethernet frame to the destination on-board ECU 111 via the communication port 21 having the specified port number.

The relaying unit 22 relays information between a plurality of on-board ECUs 111 belonging to different VLANs in the on-board network. Specifically, for example, the relaying unit 22 receives an Ethernet frame from an on-board ECU 111 belonging to the VLAN 10 via a corresponding communication port 21, and transmits the received Ethernet frame to a destination on-board ECU 111 belonging to the VLAN 20 via a communication port 21 having a port number corresponding to the transmission source IP address and the destination IP address. Furthermore, for example, the relaying unit 22 receives an Ethernet frame from an on-board ECU 111 belonging to the VLAN 20 via a corresponding communication port 21, and transmits the received Ethernet frame to a destination on-board ECU 111 belonging to the VLAN 10 via a communication port 21 having a port number corresponding to the transmission source IP address and the destination IP address.

The relaying unit 22 relays information between a plurality of on-board ECUs 111 belonging to the same VLAN in the on-board network. Specifically, for example, the relaying unit 22 receives an Ethernet frame from an on-board ECU 111 belonging to the VLAN 10 via a corresponding communication port 21, and transmits the received Ethernet frame to a destination on-board ECU 111 belonging to the VLAN 10 via a communication port 21 having a port number corresponding to the transmission source IP address and the destination IP address. Furthermore, for example, the relaying unit 22 receives an Ethernet frame from an on-board ECU 111 belonging to the VLAN 20 via a corresponding communication port 21, and transmits the received Ethernet frame to a destination on-board ECU 111 belonging to the VLAN 20 via a communication port 21 having a port number corresponding to the transmission source IP address and the destination IP address.

If the destination IP address of an Ethernet frame received from an on-board ECU 111 belonging to the VLAN 10 is a broadcast address, the relaying unit 22 transmits the Ethernet frame to another on-board ECU 111 belonging to the VLAN 10 via a communication port 21 having a port number corresponding to the transmission source IP address and broadcast address, and also adds a time stamp to the Ethernet frame and outputs the Ethernet frame to the detecting unit 23. Furthermore, if the destination IP address of an Ethernet frame received from an on-board ECU 111 belonging to the VLAN 20 is a broadcast address, the relaying unit 22 transmits the Ethernet frame to another on-board ECU 111 belonging to the VLAN 20 via a communication port 21 having a port number corresponding to the transmission source IP address and broadcast address, and also adds a time stamp to the Ethernet frame and outputs the Ethernet frame to the detecting unit 23.

The detecting unit 23 detects that on-board ECUs 111 have transitioned to the sleep state. For example, the detecting unit 23 determines that an on-board ECU 111 has transitioned to the sleep state if NM messages periodically broadcast by the on-board ECU 111 within the VLAN to which the on-board ECU 111 belongs do not arrive for a predetermined amount of time.

Specifically, if the detecting unit 23 receives an Ethernet frame from the relaying unit 22 and an NM message is included in the received Ethernet frame, the detecting unit 23 acquires the transmission source IP address, the NM message, and the time stamp from the Ethernet frame. The detecting unit 23 stores the acquired NM message in the storage unit 26 in association with the on-board ECU 111 indicated by the acquired transmission source IP address and the receive time indicated by the acquired time stamp.

The detecting unit 23 refers to NM messages stored in the storage unit 26, and determines that an on-board ECU 111 has transitioned to the sleep state if NM messages from the on-board ECU 111 have not arrived for a predetermined amount of time.

For example, if NM messages from an on-board ECU 111 do not arrive for a predetermined amount of time, the detecting unit 23 determines whether the on-board ECU 111 has transitioned to the sleep state or has failed.

Specifically, the detecting unit 23 determines that an on-board ECU 111 has transitioned to the sleep state if NM messages from the on-board ECU 111 have not arrived for a predetermined amount of time and transition information is included in the latest NM message from the on-board ECU 111.

On the other hand, the detecting unit 23 determines that an on-board ECU 111 has failed if NM messages from the on-board ECU 111 have not arrived for a predetermined amount of time and transition information is not included in the latest NM message from the on-board ECU 111.

Upon determining that an on-board ECU 111 has transitioned to the sleep state, the detecting unit 23 provides the NM transmitting unit 24 and the notifying unit 25 with a notification of sleep determination information indicating that the on-board ECU 111 has transitioned to the sleep state.

The NM transmitting unit 24 periodically transmits NM messages indicating that the relay apparatus 101 is in the active state to the on-board ECUs 111. The NM messages transmitted by the NM transmitting unit 24 are examples of a second NM message.

Specifically, while the relay apparatus 101 is in the active state, the NM transmitting unit 24 periodically generates Ethernet frames that include NM messages and that are addressed to the on-board ECUs 111, and outputs the generated Ethernet frames to the relaying unit 22.

The relaying unit 22 receives the Ethernet frames including NM messages from the NM transmitting unit 24, and transmits the received Ethernet frames to the on-board ECUs 111 via communication ports 21 having port numbers corresponding to the destination IP addresses.

For example, if it is detected by the detecting unit 23 that an on-board ECU 111 has transitioned to the sleep state, the NM transmitting unit 24 stops transmitting NM messages to the on-board ECU 111; on the other hand, the NM transmitting unit 24 continues to transmit NM messages to on-board ECUs 111 other than the on-board ECU 111 even after it is detected by the detecting unit 23 that the on-board ECU 111 has transitioned to the sleep state.

Specifically, upon receiving sleep determination information from the detecting unit 23, the NM transmitting unit 24 stops generating Ethernet frames including NM messages that are addressed to the on-board ECU 111 indicated by the received sleep determination information.

If it is detected by the detecting unit 23 that an on-board ECU 111 belonging to a VLAN has transitioned to the sleep state, the notifying unit 25 provides another on-board ECU 111 belonging to another VLAN with a sleep notification indicating that the on-board ECU 111 has transitioned to the sleep state.

Specifically, upon receiving sleep determination information from the detecting unit 23, the notifying unit 25 provides a sleep notification based on the received sleep determination information.

FIG. 4 is a diagram illustrating one example of a notification necessity table stored in the storage unit of the relay apparatus according to the embodiment of the present disclosure. With reference to FIG. 4, the storage unit 26 stores therein a notification necessity table Tb1 indicating a correspondence between a pair of on-board ECUs 111 belonging to mutually different VLANs, and a necessity as to, if one of the on-board ECUs 111 in the pair has transitioned to the sleep state, whether or not it is necessary to provide the other on-board ECU 111 in the pair with a sleep notification. The notification necessity table Tb1 is one example of notification necessity information.

Upon receiving sleep determination information from the detecting unit 23, the notifying unit 25 refers to the notification necessity table Tb1 in the storage unit 26 and determines whether or not to provide a sleep notification to the other on-board ECU 111 in a pair including the on-board ECU 111 indicated by the received sleep determination information.

As one example, upon receiving sleep determination information indicating that the on-board ECU 111C has transitioned to the sleep state from the detecting unit 23, the notifying unit 25 refers to the notification necessity table Tb1 and determines not to provide a sleep notification to the on-board ECU 111B in a pair P3 including the on-board ECU 111C while determining to provide a sleep notification to the on-board ECU 111A in a pair P1 including the on-board ECU 111C.

For example, the notifying unit 25 provides a sleep notification to the on-board ECU 111A by including, in an NM message to be transmitted by the NM transmitting unit 24, information indicating that the on-board ECU 111C has transitioned to the sleep state.

Specifically, the notifying unit 25 outputs, to the NM transmitting unit 24, a notification instruction indicating that the on-board ECU 111A is to be notified that the on-board ECU 111C has transitioned to the sleep state.

Upon receiving the notification instruction from the notifying unit 25, the NM transmitting unit 24 generates an NM message including sleep information SL indicating that the on-board ECU 111C has transitioned to the sleep state. Furthermore, the NM transmitting unit 24 generates an Ethernet frame that is addressed to the on-board ECU 111A and that includes the generated NM message, and transmits the generated Ethernet frame to the on-board ECU 111A via the relaying unit 22 and a communication port 21.

With reference to FIG. 2 once again, the receiving unit 13 in the on-board ECU 111A receives, from the relay apparatus 101, the sleep notification indicating that the on-board ECU 111C has transitioned to the sleep state. Specifically, the receiving unit 13 receives the Ethernet frame including the NM message, which includes the sleep information SL, from the relay apparatus 101 via the communication port 11, and acquires the NM message from the received Ethernet frame. The receiving unit 13 outputs the acquired NM message to the processing unit 14.

If the receiving unit 13 receives the sleep notification, the transmitting unit 12 stops transmitting measurement information to the on-board ECU 111C.

Specifically, the processing unit 14 receives the NM message from the receiving unit 13 and acquires the sleep information SL from the received NM message. Based on the acquired sleep information SL, the processing unit 14 recognizes that the on-board ECU 111C has transitioned to the sleep state. Furthermore, the processing unit 14 stops generating measurement information to be transmitted to the on-board ECU 111C.

For example, the transmitting unit 12 continues to broadcast NM messages even after the receiving unit 13 receives the sleep notification.

With reference to FIG. 3 once again, the detecting unit 23 determines that the on-board ECU 111C has transitioned to the active state if an NM message from the on-board ECU 111C arrives after the detecting unit 23 detects that the on-board ECU 111C has transitioned to the sleep state. Furthermore, the detecting unit 23 provides the NM transmitting unit 24 and the notifying unit 25 with a notification of active determination information indicating that the on-board ECU 111C has transitioned to the active state.

Upon receiving the active determination information from the detecting unit 23, the NM transmitting unit 24 starts to generate Ethernet frames that include NM messages and that are addressed to the on-board ECU 111C indicated by the received active determination information.

With reference to FIG. 4 once again, the notification necessity table Tb1 in the storage unit 26 further indicates a correspondence between a pair of on-board ECUs 111 belonging to mutually different VLANs and a necessity as to, if one of the on-board ECUs 111 in the pair has transitioned to the active state, whether or not it is necessary to provide the other on-board ECU 111 in the pair with an active notification.

With reference to FIG. 3 once again, upon receiving the active determination information indicating that the on-board ECU 111C has transitioned to the active state from the detecting unit 23, the notifying unit 25 refers to the notification necessity table Tb1 and determines to provide the on-board ECU 111A with an active notification indicating that the on-board ECU 111C has transitioned to the active state. Furthermore, the notifying unit 25 outputs, to the NM transmitting unit 24, a notification instruction indicating that the on-board ECU 111A is to be notified that the on-board ECU 111C has transitioned to the active state.

Upon receiving the notification instruction from the notifying unit 25, the NM transmitting unit 24 generates an NM message including active information AC indicating that the on-board ECU 111C has transitioned to the active state. Furthermore, the NM transmitting unit 24 generates an Ethernet frame that is addressed to the on-board ECU 111A and that includes the generated NM message, and transmits the generated Ethernet frame to the on-board ECU 111A via the relaying unit 22 and a communication port 21.

With reference to FIG. 2 once again, the receiving unit 13 in the on-board ECU 111A receives the Ethernet frame including the NM message, which includes the active information AC, from the relay apparatus 101 via the communication port 11, and acquires the NM message from the received Ethernet frame. The receiving unit 13 outputs the acquired NM message to the processing unit 14.

The processing unit 14 receives the NM message from the receiving unit 13 and acquires the active information AC from the received NM message. Based on the acquired active information AC, the processing unit 14 recognizes that the on-board ECU 111C has transitioned to the active state. Furthermore, the processing unit 14 starts to periodically output measurement information to the transmitting unit 12.

The transmitting unit 12 generates Ethernet frames including measurement information received from the processing unit 14, and transmits the generated Ethernet frames to the on-board ECU 111C via the communication port 11 and the relay apparatus 101.

Operation Flow

Each apparatus in the on-board communication system according to the embodiment of the present disclosure includes a computer including a memory, and a computation processing unit, such as a CPU, in the computer reads, from the memory, and executes a program including some or all of the steps in the following sequence. The programs of the plurality of apparatuses can each be installed from the outside. The programs of the plurality of apparatuses are each distributed in a state in which the program is stored in a recording medium or distributed via a communication line.

Figure 5:
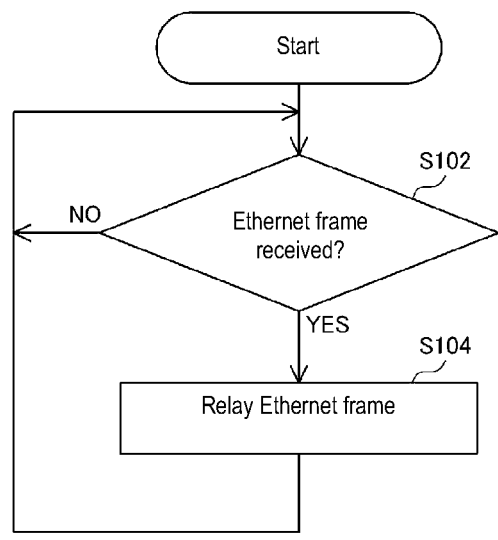
FIG. 5 is a flowchart defining one example of an operation procedure when the relay apparatus according to the embodiment of the present disclosure performs relay processing.

FIG. 5 is a flowchart defining one example of an operation procedure when the relay apparatus according to the embodiment of the present disclosure performs relay processing. With reference to FIG. 5, the relay apparatus 101 first waits for Ethernet frames from the on-board ECUs 111 (NO in step S102), and, upon receiving an Ethernet frame from an on-board ECU 111 (YES in step S102), relays the received Ethernet frame. For example, the relay apparatus 101 receives an Ethernet frame including measurement information from the on-board ECU 111A belonging to the VLAN 10, and transmits the received Ethernet frame to the on-board ECU 111C belonging to the VLAN 20 (step S104).

Figure 6:
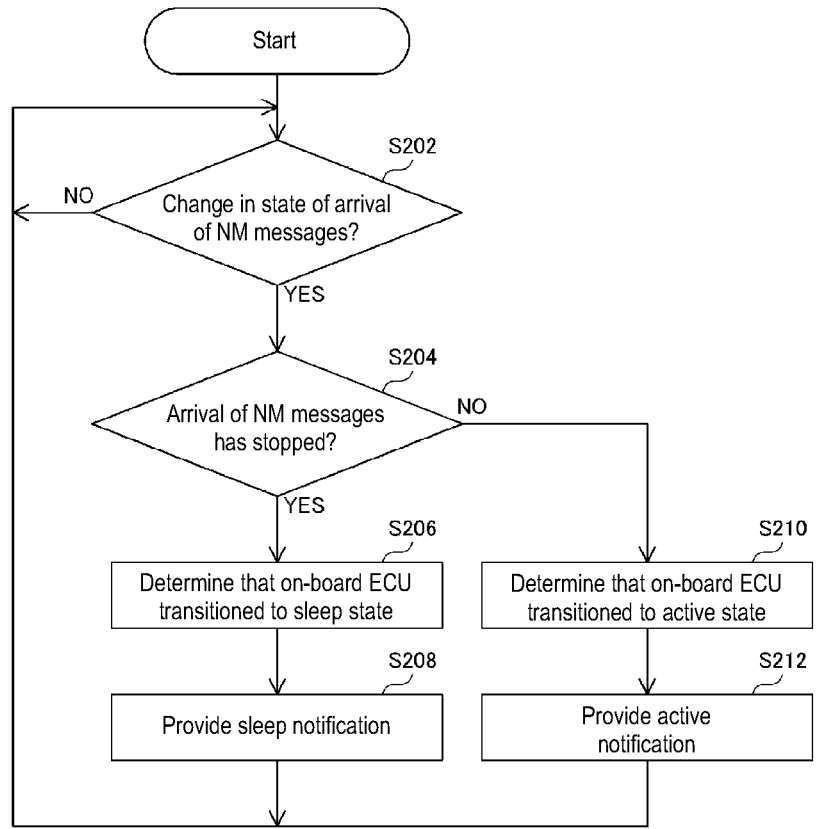
FIG. 6 is a flowchart defining one example of an operation procedure when the relay apparatus according to the embodiment of the present disclosure provides a sleep notification.

FIG. 6 is a flowchart defining one example of an operation procedure when the relay apparatus according to the embodiment of the present disclosure provides a sleep notification. With reference to FIG. 6, first, the relay apparatus 101 waits for a change in the state of arrival of NM messages from the on-board ECUs 111 (NO in step S202), and, if the arrival of NM messages from the on-board ECU 111C stops for example (YES in step S202 and YES in step S204), determines that the on-board ECU 111C has transitioned to the sleep state. Specifically, for example, the relay apparatus 101 determines that the on-board ECU 111 has transitioned to the sleep state if NM messages have not arrived from the on-board ECU 111C for a predetermined amount of time and transition information is included in the latest NM message from the on-board ECU 111C (step S206).

Next, the relay apparatus 101 provides the on-board ECU 111A with a sleep notification indicating that the on-board ECU 111C has transitioned to the sleep state. Specifically, the relay apparatus 101 generates an NM message including sleep information SL indicating that the on-board ECU 111C has transitioned to the sleep state, and transmits an Ethernet frame including the generated NM message to the on-board ECU 111A (step S208).

Next, the relay apparatus 101 waits for a new change in the state of arrival of NM messages from the on-board ECUs 111, and, if the arrival of NM messages from the on-board ECU 111C is resumed for example (YES in step S202 and NO in step S204), determines that the on-board ECU 111C has transitioned to the active state (step S210).

Next, the relay apparatus 101 provides the on-board ECU 111A with an active notification indicating that the on-board ECU 111C has transitioned to the active state. Specifically, the relay apparatus 101 generates an NM message including active information AC indicating that the on-board ECU 111C has transitioned to the active state, and transmits an Ethernet frame including the generated NM message to the on-board ECU 111A (step S212).

Next, the relay apparatus 101 waits for a new change in the state of arrival of NM messages from the on-board ECUs 111 (NO in step S202).

Figure 7:
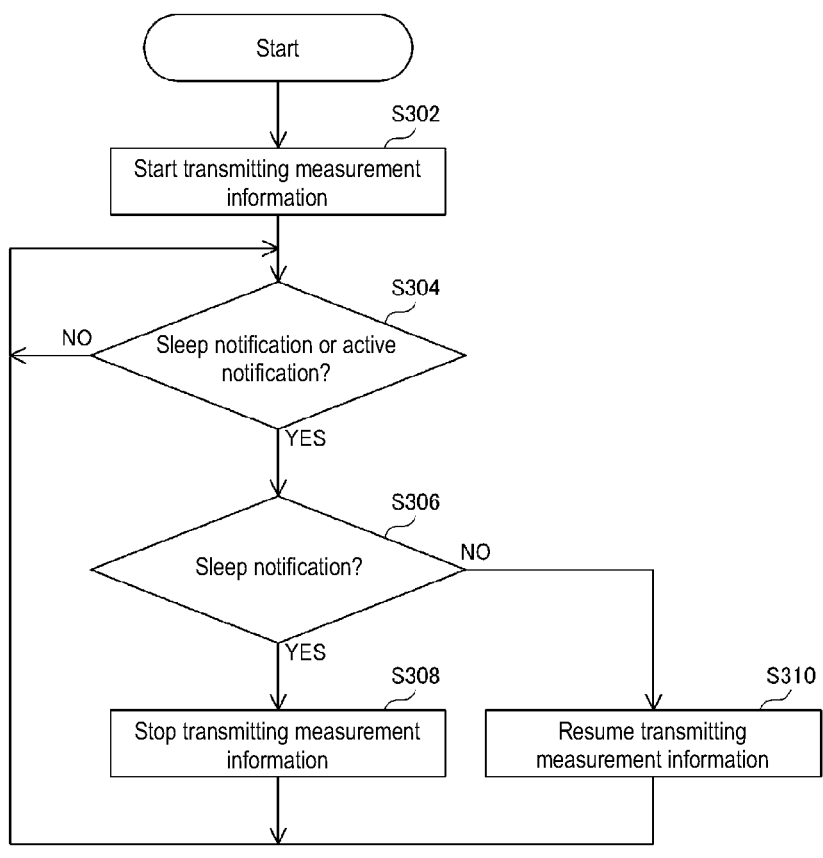
FIG. 7 is a flowchart defining one example of an operation procedure when an on-board ECU according to the embodiment of the present disclosure transmits information to another on-board ECU.

FIG. 7 is a flowchart defining one example of an operation procedure when an on-board ECU according to the embodiment of the present disclosure transmits information to another on-board ECU. FIG. 7 is a flowchart defining one example of an operation procedure when the on-board ECU 111A transmits measurement information to the on-board ECU 111C.

With reference to FIG. 7, first, the on-board ECU 111A starts to transmit measurement information to the on-board ECU 111C. Specifically, the on-board ECU 111A periodically transmits measurement information to the on-board ECU 111C via the relay apparatus 101 by including measurement information in Ethernet frames (step S302).

Next, the on-board ECU 111A repeats the periodic transmission of measurement information to the on-board ECU 111C until the on-board ECU 111A receives a sleep notification or an active notification from the relay apparatus 101 (NO in step S304).

Next, upon receiving a sleep notification from the relay apparatus 101, or specifically, upon receiving an Ethernet frame that includes an NM message including sleep information SL from the relay apparatus 101 (YES in step S304 and YES in step S306), the on-board ECU 111A recognizes that the on-board ECU 111C has transitioned to the sleep state, and stops transmitting measurement information to the on-board ECU 111C (step S308).

Next, the on-board ECU 111A waits for a sleep notification or an active notification (NO in step S304), and, upon receiving an active notification from the relay apparatus 101, or specifically, upon receiving an Ethernet frame including an NM message including active information AC from the relay apparatus 101 (YES in step S304 and NO in step S306), the on-board ECU 111A recognizes that the on-board ECU 111C has transitioned to the active state, and resumes transmitting measurement information to the on-board ECU 111C (step S310).

Figure 8:
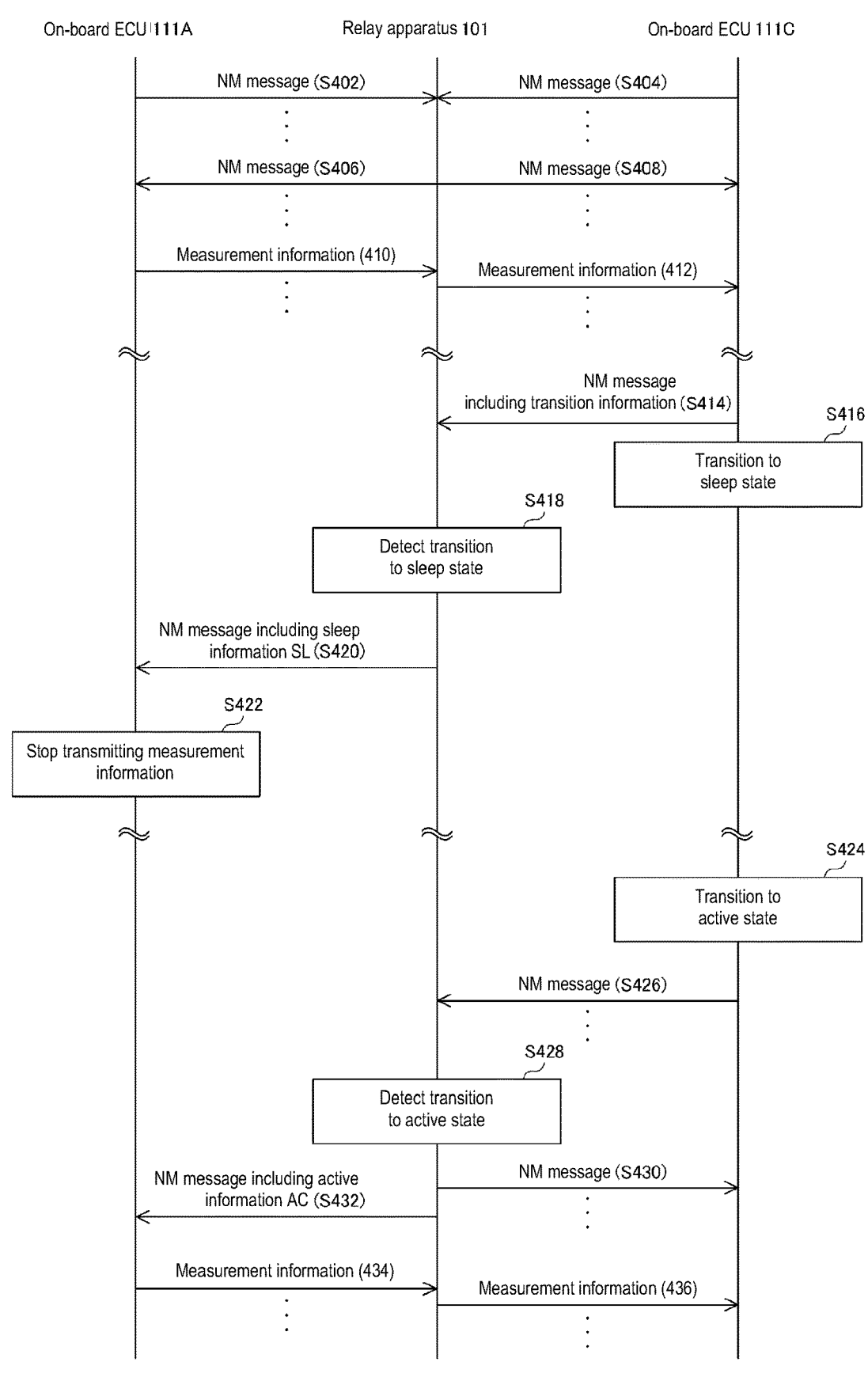
FIG. 8 is a diagram illustrating one example of a communication sequence in the on-board communication system according to the embodiment of the present disclosure.

FIG. 8 is a diagram illustrating one example of a communication sequence in the on-board communication system according to the embodiment of the present disclosure. FIG. 8 illustrates a sequence of communication between the relay apparatus 101 and the on-board ECUs 111A and 111C.

With reference to FIG. 8, first, the on-board ECU 111A periodically broadcasts NM messages within the VLAN 10 (step S402).

Also, the on-board ECU 111C periodically broadcasts NM messages within the VLAN 20 (step S404).

Furthermore, the relay apparatus 101 periodically transmits NM messages to the on-board ECU 111A (step S406), and periodically transmits NM messages to the on-board ECU 111C (step S408).

Furthermore, the on-board ECU 111A periodically transmits, to the relay apparatus 101, Ethernet frames that are addressed to the on-board ECU 111C and that include measurement information (step S410).

The relay apparatus 101 relays the Ethernet frames received from the on-board ECU 111A to the on-board ECU 111C (step S412).

Next, the on-board ECU 111C detects that the state of the vehicle 1 has satisfied the sleep condition, and broadcasts an NM message including transition information (step S414).

Next, the on-board ECU 111C transitions to the sleep state, and stops periodically transmitting NM messages (step S416).

Next, because the arrival of NM messages from the on-board ECU 111C stops and transition information is included in the latest NM message, the relay apparatus 101 determines that the on-board ECU 111C has transitioned to the sleep state and stops transmitting NM messages to the on-board ECU 111C (step S418).

Next, the relay apparatus 101 includes sleep information SL in an NM message and transmits the NM message to the on-board ECU 111A (step S420).

Next, the on-board ECU 111A receives the NM message including the sleep information SL from the relay apparatus 101, and recognizes that the on-board ECU 111C has transitioned to the sleep state. Furthermore, the on-board ECU 111A stops transmitting Ethernet frames that are addressed to the on-board ECU 111C and that include measurement information (step S422).

Next, the on-board ECU 111C detects that the state of the vehicle 1 has satisfied the wake-up condition, and transitions to the active state (step S424).

Next, the on-board ECU 111C resumes periodically broadcasting NM messages (step S426).

Next, the relay apparatus 101 receives an NM message from the on-board ECU 111C, and determines that the on-board ECU 111C has transitioned to the active state (step S428).

Next, the relay apparatus 101 resumes transmitting NM messages to the on-board ECU 111C (step S430).

Next, the relay apparatus 101 includes active information AC in an NM message and transmits the NM message to the on-board ECU 111A (step S432).

Next, the on-board ECU 111A receives the NM message including the active information AC from the relay apparatus 101, and recognizes that the on-board ECU 111C has transitioned to the active state. Furthermore, the on-board ECU 111A resumes transmitting Ethernet frames that are addressed to the on-board ECU 111C and that include measurement information (step S434).

The relay apparatus 101 relays the Ethernet frames received from the on-board ECU 111A to the on-board ECU 111C (step S436).

Note that, while the on-board ECU 111A is a sensor in the on-board communication system 301 according to the embodiment of the present disclosure, there is no limitation to this. The on-board ECU 111A may be an on-board apparatus other than a sensor. Furthermore, while the on-board ECU 111C is a driving assistance apparatus, there is no limitation to this. The on-board ECU 111C may be an on-board apparatus other than a driving assistance apparatus.

Furthermore, while the detecting unit 23 in the relay apparatus 101 according to the embodiment of the present disclosure is configured to determine that an on-board ECU 111 has transitioned to the sleep state if NM messages that are periodically broadcast by the on-board ECU 111 within the VLAN to which the on-board ECU 111 belongs does not arrive for a predetermined amount of time, there is no limitation to this. For example, the detecting unit 23 may be configured to monitor the state of power supply to an on-board ECU 111 from an unillustrated power source installed in the vehicle 1, and determine that the on-board ECU 111 has transitioned to the sleep state based on the monitoring result. Specifically, the detecting unit 23 determines that an on-board ECU 111 has transitioned to the sleep state if the amount of power supplied to the on-board ECU 111 from the power source falls below a predetermined value.

Furthermore, while the detecting unit 23 in the relay apparatus 101 according to the embodiment of the present disclosure is configured to determine whether an on-board ECU 111 has transitioned to the sleep state or has failed if NM messages from the on-board ECU 111 do not arrive for a predetermined amount of time, there is no limitation to this. The detecting unit 23 may be configured to determine that an on-board ECU 111 has transitioned to the sleep state if NM messages from the on-board ECU 111 do arrive for a predetermined amount of time, without determining whether or not the on-board ECU 111 has failed.

Furthermore, while the storage unit 26 in the relay apparatus 101 according to the embodiment of the present disclosure is configured to store therein the notification necessity table Tb1 indicating a correspondence between a pair of on-board ECUs 111 belonging to mutually different VLANs and a necessity as to, if one of the on-board ECUs 111 in the pair has transitioned to the sleep state, whether or not it is necessary to provide the other on-board ECU 111 in the pair with a sleep notification, there is no limitation to this. The storage unit 26 may be configured so as to not store the notification necessity table Tb1 therein. In this case, for example, if it is detected by the detecting unit 23 that an on-board ECU 111 has transitioned to the sleep state, the notifying unit 25 provides a sleep notification to all on-board ECUs 111 belonging to a VLAN that is different from the VLAN to which the on-board ECU 111 belongs.

Furthermore, while the notifying unit 25 in the relay apparatus 101 according to the embodiment of the present disclosure is configured to provide a sleep notification by including information indicating that an on-board ECU 111 has transitioned to the sleep state in an NM message to be transmitted by the NM transmitting unit 24, there is no limitation to this. For example, the notifying unit 25 may be configured to provide a sleep notification by separately generating an Ethernet frame including sleep information SL and transmitting the generated Ethernet frame to a destination on-board ECU 111 via the relaying unit 22 and a communication port 21.

Furthermore, while the transmitting unit 12 in the on-board ECUs 111 according to the embodiment of the present disclosure is configured to continue to broadcast NM messages even after a sleep notification is received by the receiving unit 13, there is no limitation to this. The transmitting unit 12 may be configured to stop broadcasting NM messages if a sleep notification is received by the receiving unit 13, and to resume broadcasting NM messages if an active notification is received by the receiving unit 13.

Incidentally, there is a demand for a technique realizing a further reduction in the communication traffic in an on-board communication system. Specifically, in an on-board communication system in which Ethernet frames including measurement information are periodically transmitted from the on-board ECU 111A to the on-board ECU 111C, Ethernet frames addressed to the on-board ECU 111C that are transmitted by the on-board ECU 111A are not received by the on-board ECU 111C if the on-board ECU 111C transitions to the sleep state. Accordingly, in order to reduce communication traffic in the on-board communication system, it is desirable to stop the transmission of Ethernet frames addressed to the on-board ECU 111C by the on-board ECU 111A during a period in which the on-board ECU 111C is in the sleep state.

For example, if the on-board ECU 111A belongs to the same VLAN as the on-board ECU 111C, the on-board ECU 111A can detect that the on-board ECU 111C has transitioned to the sleep state based on the state of arrival of NM messages broadcast from the on-board ECU 111C, and stop transmitting Ethernet frames addressed to the on-board ECU 111C.

However, if the on-board ECU 111A belongs to a VLAN that is different from the VLAN to which the on-board ECU 111C belongs, the on-board ECU 111A cannot detect that the on-board ECU 111C has transitioned to the sleep state, and thus cannot stop transmitting Ethernet frames addressed to the on-board ECU 111C during a period in which the on-board ECU 111C is in the sleep state.

In contrast, in the relay apparatus 101 according to the embodiment of the present disclosure, the relaying unit 22 relays information between a plurality of on-board ECUs 111 belonging to mutually different VLANs. The detecting unit 23 detects that the on-board ECU 111C has transitioned to the sleep state. If it is detected by the detecting unit 23 that the on-board ECU 111C has transitioned to the sleep state, the notifying unit 25 provides the on-board ECU 111A with a sleep notification indicating that the on-board ECU 111C has transitioned to the sleep state.

As a result of a configuration being adopted in which the relay apparatus 101 detects that the on-board ECU 111C has transitioned to the sleep state and provides the on-board ECU 111A, which belongs to a VLAN different from the VLAN of the on-board ECU 111C, with a sleep notification indicating that the on-board ECU 111C has transitioned to the sleep state in such a manner, it is possible to have the on-board ECU 111A recognize that the on-board ECU 111C has transitioned to the sleep state, and thus transmission of information from the on-board ECU 111A to the on-board ECU 111C during a period in which the on-board ECU 111C is in the sleep state can be stopped, for example. Thus, communication traffic in an on-board communication system can be reduced to a further extent.

The above-described embodiments are examples in every way, and shall be construed as being non-limiting. The scope of the present disclosure is not limited to the description above, and is intended to include all modifications that are indicated by the claims and are within the meaning and scope of equivalents of the claims.

The description above includes the supplementary feature described below.

An on-board communication system comprising: first and second on-board apparatuses that belong to mutually different VLANs; and an on-board relay apparatus, wherein the on-board relay apparatus relays information between the first and second on-board apparatuses, the second on-board apparatus transmits information to the first on-board apparatus via the on-board relay apparatus, the on-board relay apparatus detects that the first on-board apparatus has transitioned to a sleep state, and provides the second on-board apparatus with a sleep notification indicating that the first on-board apparatus has transitioned to the sleep state, and the second on-board apparatus receives the sleep notification from the on-board relay apparatus and stops transmitting information to the second on-board apparatus.

The invention claimed is:

1. An on-board relay apparatus comprising:
   a relaying unit configured to relay information between a plurality of on-board apparatuses belonging to mutually different virtual local area networks (VLANs);
   a detecting unit configured to detect that the on-board apparatuses have transitioned to a sleep state; and
   a notifying unit configured to, if it is detected by the detecting unit that a first on-board apparatus among the plurality of on-board apparatuses has transitioned to the sleep state, provide a second on-board apparatus among the plurality of on-board apparatuses with a sleep notification indicating that the first on-board apparatus has transitioned to the sleep state.

2. The on-board relay apparatus according to claim 1, wherein the detecting unit detects that the first on-board apparatus has transitioned to the sleep state if a first network management (NM) message that is periodically broadcast by the first on-board apparatus within a VLAN to which the first on-board apparatus belongs and that indicates that the first on-board apparatus is in an active state does not arrive for a predetermined amount of time.

3. The on-board relay apparatus according to claim 2, wherein, if the first NM message does not arrive for the predetermined amount of time, the detecting unit determines whether the first on-board apparatus has transitioned to the sleep state or has failed.

4. The on-board relay apparatus according to claim 3, further including;
a storage unit configured to store therein notification necessity information indicating a correspondence between a pair of the on-board apparatuses belonging to mutually different VLANs, and a necessity as to, if one of the on-board apparatuses in the pair has transitioned to the sleep state, whether or not it is necessary to provide the other on-board apparatus in the pair with the sleep notification.

5. The on-board relay apparatus according to claim 3, wherein the second on-board apparatus is a sensor, and the first on-board apparatus is a driving assistance apparatus that provides driving assistance based on a measurement result of the sensor.

6. The on-board relay apparatus according to claim 3, further including;
a transmitting unit configured to periodically transmit, to the on-board apparatuses, a second NM message that indicates that the on-board relay apparatus is in the active state,
wherein the transmitting unit continues to transmit the second NM message to the second on-board apparatus even after it is detected by the detecting unit that the first on-board apparatus has transitioned to the sleep state, and
the notifying unit provides the second on-board apparatus with the sleep notification by including, in the second NM message transmitted by the transmitting unit, information indicating that the first on-board apparatus has transitioned to the sleep state.

7. The on-board relay apparatus according to claim 2, further including;
a storage unit configured to store therein notification necessity information indicating a correspondence between a pair of the on-board apparatuses belonging to mutually different VLANs, and a necessity as to, if one of the on-board apparatuses in the pair has transitioned to the sleep state, whether or not it is necessary to provide the other on-board apparatus in the pair with the sleep notification.

8. The on-board relay apparatus according to claim 2, wherein the second on-board apparatus is a sensor, and the first on-board apparatus is a driving assistance apparatus that provides driving assistance based on a measurement result of the sensor.

9. The on-board relay apparatus according to claim 2, further including;
a transmitting unit configured to periodically transmit, to the on-board apparatuses, a second NM message that indicates that the on-board relay apparatus is in the active state,
wherein the transmitting unit continues to transmit the second NM message to the second on-board apparatus even after it is detected by the detecting unit that the first on-board apparatus has transitioned to the sleep state, and the notifying unit provides the second on-board apparatus with the sleep notification by including, in the second NM message transmitted by the transmitting unit, information indicating that the first on-board apparatus has transitioned to the sleep state.

10. The on-board relay apparatus according to claim 1, further including;
a storage unit configured to store therein notification necessity information indicating a correspondence between a pair of the on-board apparatuses belonging to mutually different VLANs, and a necessity as to, if one of the on-board apparatuses in the pair has transitioned to the sleep state, whether or not it is necessary to provide the other on-board apparatus in the pair with the sleep notification.

11. The on-board relay apparatus according to claim 10, wherein the second on-board apparatus is a sensor, and the first on-board apparatus is a driving assistance apparatus that provides driving assistance based on a measurement result of the sensor.

12. The on-board relay apparatus according to claim 10, further including;
a transmitting unit configured to periodically transmit, to the on-board apparatuses, a second NM message that indicates that the on-board relay apparatus is in the active state,
wherein the transmitting unit continues to transmit the second NM message to the second on-board apparatus even after it is detected by the detecting unit that the first on-board apparatus has transitioned to the sleep state, and
the notifying unit provides the second on-board apparatus with the sleep notification by including, in the second NM message transmitted by the transmitting unit, information indicating that the first on-board apparatus has transitioned to the sleep state.

13. The on-board relay apparatus according to claim 1, wherein the second on-board apparatus is a sensor, and the first on-board apparatus is a driving assistance apparatus that provides driving assistance based on a measurement result of the sensor.

14. The on-board relay apparatus according to claim 13, further including;
a transmitting unit configured to periodically transmit, to the on-board apparatuses, a second NM message that indicates that the on-board relay apparatus is in the active state,
wherein the transmitting unit continues to transmit the second NM message to the second on-board apparatus even after it is detected by the detecting unit that the first on-board apparatus has transitioned to the sleep state, and
the notifying unit provides the second on-board apparatus with the sleep notification by including, in the second NM message transmitted by the transmitting unit, information indicating that the first on-board apparatus has transitioned to the sleep state.

15. The on-board relay apparatus according to claim 1, further including;
a transmitting unit configured to periodically transmit, to the on-board apparatuses, a second NM message that indicates that the on-board relay apparatus is in the active state,
wherein the transmitting unit continues to transmit the second NM message to the second on-board apparatus even after it is detected by the detecting unit that the first on-board apparatus has transitioned to the sleep state, and the notifying unit provides the second on-board apparatus with the sleep notification by including, in the second NM message transmitted by the transmitting unit, information indicating that the first on-board apparatus has transitioned to the sleep state.

16. An on-board apparatus comprising:

a transmitting unit configured to transmit information to another on-board apparatus belonging to a different VLAN via an on-board relay apparatus; and a receiving unit configured to receive, from the on-board relay apparatus, a sleep notification indicating that the other on-board apparatus has transitioned to a sleep state, wherein the transmitting unit stops transmitting information to the other on-board apparatus if the receiving unit receives the sleep notification.

17. The on-board apparatus according to claim 16, wherein the transmitting unit periodically broadcasts, within a VLAN to which the on-board apparatus belongs, an NM message indicating that the on-board apparatus is in an active state, and the transmitting unit continues to broadcast the NM message even after the receiving unit receives the sleep notification.

18. A sleep notification method comprising:

a step for relaying information between a plurality of on-board apparatuses belonging to mutually different VLANs;

a step for detecting that a first on-board apparatus among the plurality of on-board apparatuses has transitioned to a sleep state; and a step for providing a second on-board apparatus among the plurality of on-board apparatuses with a sleep notification indicating that the first on-board apparatus has transitioned to the sleep state.

* * * * *